(12) United States Patent
Tseng

(10) Patent No.: US 8,165,066 B2
(45) Date of Patent: Apr. 24, 2012

(54) METHOD AND APPARATUS FOR PERFORMING BUFFER STATUS REPORTING

(75) Inventor: Li-Chih Tseng, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 513 days.

(21) Appl. No.: 12/346,781

(22) Filed: Dec. 30, 2008

(65) Prior Publication Data
US 2009/0175229 A1    Jul. 9, 2009

Related U.S. Application Data

(60) Provisional application No. 61/018,676, filed on Jan. 3, 2008.

(51) Int. Cl.
*H04W 4/00* (2009.01)
(52) U.S. Cl. .................................................... 370/328
(58) Field of Classification Search .................. 370/241, 370/252, 310–350, 412, 428, 429
See application file for complete search history.

(56) References Cited

U.S. PATENT DOCUMENTS
2009/0113086 A1*  4/2009  Wu et al. ................... 710/56

FOREIGN PATENT DOCUMENTS
| | | | |
|---|---|---|---|
| KR | 1020060082734 A | 7/2006 | |
| KR | 1020070076237 A | 7/2007 | |
| WO | 2007147431 A1 | 12/2007 | |
| WO | 2009059995 A1 | 5/2009 | |

OTHER PUBLICATIONS

Wu et al, A method for UL Scheduling Informaition, U.S. Appl. No. 61/000,729.*
Wu et al, Buffer Status Report trippers in E-UTRA, U.S. Appl. No. 61/006,248.*
3GPP TS 36.321 V8.0.0 (Dec. 2007), 3rd Generation Partnership Project, Technical Specification Group Radio Access Network, Evolved Universal Terrestrial Radio Access (E-UTRA), Medium Access Control (MAC) protocol specification (Release 8).
Notice of Allowance on corresponding foreign application (KR 10-2009-0000132) from the Korean Intellectual Property Office dated Oct. 25, 2010.
3GPP: 3rd Generation Partnership Project; Technical Specification Group Radio Access Network; Evolved Universal Terrestrial Radio Access (E-UTRA) Medium Access Control (MAC) protocol specification (Release 8), Nov. 2007, pp. 1-23, 3GPP TS 36.321 V2.0.0, XP002521802, France.

(Continued)

*Primary Examiner* — Ricky Ngo
*Assistant Examiner* — Wei-Po Kao
(74) *Attorney, Agent, or Firm* — Klein, O'Neill & Singh, LLP

(57) ABSTRACT

A method for performing buffer status reporting (BSR) in a user equipment of a wireless communication system comprises forming a MAC PDU comprising a padding field with a size smaller than a first predefined value, selecting a first logic channel group from a plurality of logic channel groups of the user equipment according to priorities and data amounts of uplink buffers of the plurality of logic channel groups, carrying information about a data amount of an uplink buffer of the first logic channel group with a short-format BSR control element, and carrying the short-format BSR control element with the padding field of the MAC PDU for a network of the wireless communication system.

12 Claims, 4 Drawing Sheets

OTHER PUBLICATIONS

NTT DOCOMO, Inc., NEC: "Buffer Status Report and Scheduling Request triggers", 3GPP TSG RAN WG2 #59bis, R2-074173, XP050136797, Oct. 8-12, 2007, Shanghai, China.
QUALCOMM Europe: "BSR Triggers", 3GPP TSG-RAN WG2 #60, R2-075165, XP050137610, Nov. 5-9, 2007, Jeju, Korea.
3GPP TS 36.300 V8.1.0 (Jun. 2007).
3GPP TS 36.321 V3.1.0 (Nov. 2007).
3GPP TSG RAN WG2 #59bis, Oct. 8-12, 2007, Shanghai, China, document R2-074173.
3GPP TSG RAN WG2 #60, Nov. 5-9, 2007 Jeju, Korea, document R2-074860.
3GPP TSG RAN WG2 #60, Nov. 5-9, 2007, Jeju, Korea, document R2-075432.
3GPP TSG RAN WG2 #60, Jeju, Korea, Nov. 5-9, 2007, document R2-074735.
3GPP TSG RAN WG2#59bis, Oct. 8-12, 2007, Shanghai, China, document R2-074149.
3GPP TSG-RAN WG2 #59, Athens, Greece, Aug. 20-24, 2007. document R2-073211.
3GPP TSG-RAN WG2 #59bis, Shanghai, China, Oct. 8-12, 2007, document R2-073935.
3GPP TSG-RAN WG2 Meeting #45, Yokohama, Japan, Nov. 15-19, 2004, document R2-042462.
3GPP TSG-RAN WG2 Meeting #52, Athens, Greece, Mar. 27-31, 2006, document R2-060829.
3GPP TSG-RAN WG2 Meeting#60, Jeju, South Korea, Nov. 5-9, 2007, document R2-074682.
3GPP TSG-RAN2 Meeting #61, Sorrento, Italy, Feb. 11-15, 2008, document R2-081389.
Email dated Sat. Feb. 23, 2008 from Magnus Lindstroem Q.
Email dated Wed, Nov. 21, 2007 from Chaponniere, Etienne, entitled E-UTRA MAC v1.3.0.
Print out of 3GPP_TSG_RAN_WG2 Archives—Nov. 2007.
Print out of Index of ftp tsg_ran WG2_RL2 TSGR2_59bis Docs.
Print out of Index of ftp tsg_ran WG2_RL2 TSGR2_60 Docs.
Print out of Index of ftp tsg_ran WG2_RL2 TSGR2_61 Docs.
TSG-RAN WG 2 (Radio layer 2 and Radio layer 3) Berlin, May 25-28, 1999, TSGE2#4(99405).
U.S. Appl. No. 60/996,168.
Communication of a notice of opposition on related EP Patent Application No. 09000013.4 issued on May 24, 2011.

* cited by examiner

METHOD AND APPARATUS FOR PERFORMING BUFFER STATUS REPORTING

CROSS REFERENCE TO RELATED APPLICATIONS

This application claims the benefit of U.S. Provisional Application No. 61/018,676, filed on Jan. 3, 2008 and entitled "Method and Apparatus for optimizing buffer status reporting and RLC status reporting", the contents of which are incorporated herein by reference.

BACKGROUND OF THE INVENTION

1. Field of the Invention

The present invention relates to a method and apparatus for performing buffer status reporting (BSR), and more particularly, to a method and apparatus for accurately deciding a logic channel group corresponding to a short-format BSR control element when performing BSR.

2. Description of the Prior Art

Long Term Evolution wireless communication system (LTE system), an advanced high-speed wireless communication system established upon the 3G mobile telecommunication system, supports only packet-switched transmission, and tends to implement both Medium Access Control (MAC) layer and Radio Link Control (RLC) layer in one single communication site, such as in Node B (NB) alone rather than in NB and RNC (Radio Network Controller) respectively, so that the system structure becomes simple.

In LTE, MAC provides transmission services via a plurality of logic channels. To manage uplink resources, when a user equipment (UE) performs uplink (UL) transmission, the network can divide or map logic channels of the UE into at most four groups based on priorities, types, and so on. The priorities are corresponding to values 1 to 8, and assigned by a higher layer, the radio resource control layer. Besides, the 3rd Generation Partnership Project, 3GPP, introduces a Buffer Status Reporting (BSR) procedure, which is used to provide the serving NB (or enhanced NB) with information about the amount of data in UL buffers of the UE.

In the BSR procedure, UE uses a MAC PDU (Protocol Data Unit) to carry a BSR control element, so as to report information about the amount of data in the UL buffers to the network. Accordingly, the network can determine the total amount of data available across one or all logical channel groups. According to different requirements, BSR control elements can be categorized into two formats: short and long. A short-format BSR control element is 1-byte long, and has 8 bits, where the former 2 bits indicate one logic channel group which buffer status is being reported, and the remaining six bits indicate the amount of data available across the logic channel group. A long-format BSR control element is three-byte long, and utilized for reporting data amount of the UL buffers of all the logic channel groups. Detailed description of the two formats can be found in related protocol specifications, and not narrated herein.

Via the long-format BSR control element, the network can recognized data amount of the UL buffers of all logic channel groups. However, the long-format BSR control element occupies much more bytes than the short-format BSR control element does, such that the long-format BSR control element is not suitable for the situation that the length of the MAC PDU is insufficient. For example, in some situations, UE can use a padding field of a MAC PDU to carry a BSR control element. If the padding field is not long enough, the short-format BSR control element is used. Since the short-format BSR control element carries information about the amount of data available across only one logical channel group, the MAC layer needs to select a logic channel group to be reported. However, the prior art does not disclose which logic channel group is corresponding to information carried by the short-format BSR control element.

SUMMARY OF THE INVENTION

The present invention discloses a method for performing buffer status reporting in a user equipment of a wireless communication system, which comprises forming a MAC PDU comprising a padding field with a size smaller than a first predefined value, selecting a first logic channel group from a plurality of logic channel groups of the user equipment according to priorities and data amounts of uplink buffers of the plurality of logic channel groups, carrying information about a data amount of an uplink buffer of the first logic channel group with a short-format BSR control element, and carrying the short-format BSR control element with the padding field of the MAC PDU for a network of the wireless communication system.

The present invention further discloses a communication device utilized in a receiver of a wireless communication system for accurately performing buffer status reporting, which comprises a processor for executing a program code, and a memory coupled to the processor for storing the program code. The program code comprises forming a MAC PDU comprising a padding field with a size smaller than a first predefined value, selecting a first logic channel group from a plurality of logic channel groups of the user equipment according to priorities and data amounts of uplink buffers of the plurality of logic channel groups, carrying information about a data amount of an uplink buffer of the first logic channel group with a short-format BSR control element, and carrying the short-format BSR control element with the padding field of the MAC PDU for a network of the wireless communication system.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
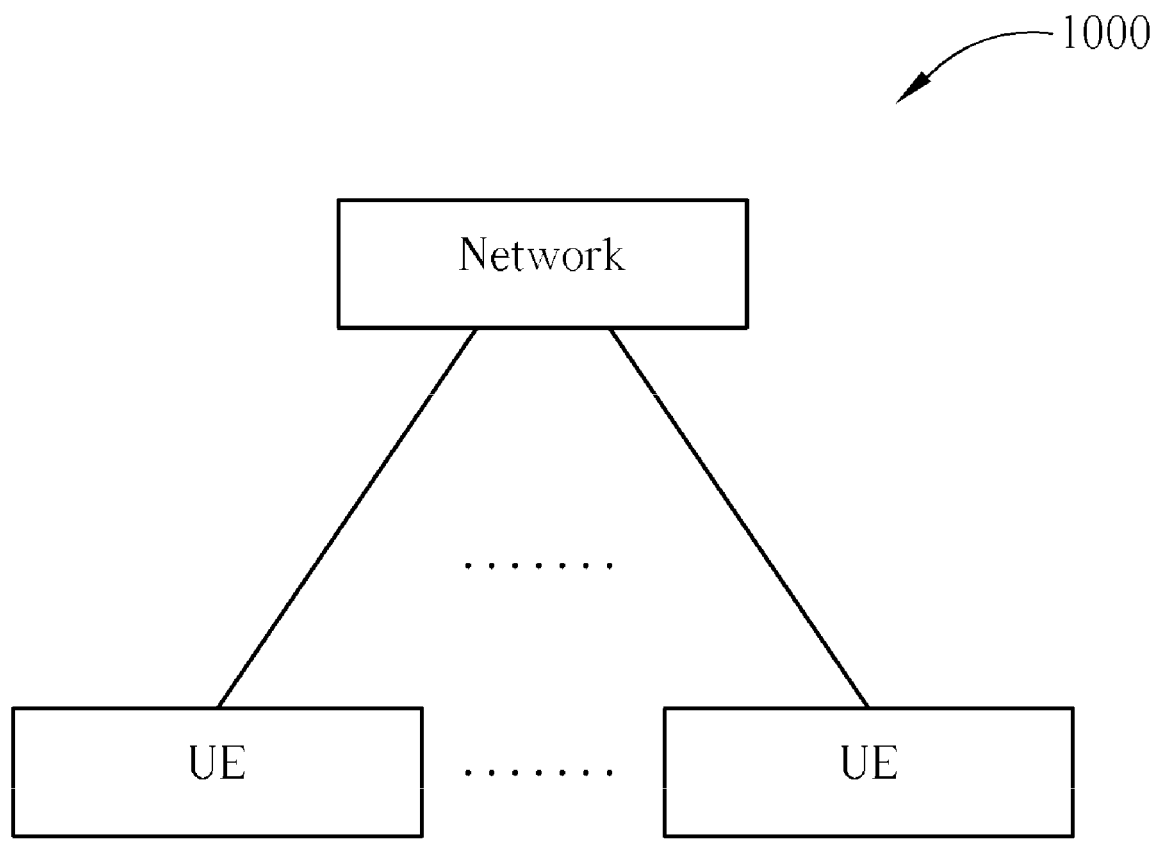
FIG. 1 is a schematic diagram of a wireless communications system.

Please refer to FIG. 1, which illustrates a schematic diagram of a wireless communication system 1000. The wireless communication system 1000 is preferably an LTE (long-term evolution) system, and is briefly composed of a network and a plurality of UEs. In FIG. 1, the network and the UEs are simply utilized for illustrating the structure of the wireless communication system 1000. Practically, the network may comprise a plurality of base stations (Node Bs), radio network controllers and so on according to actual demands, and the UEs can be devices such as mobile phones, computer systems, etc.

Figure 2:
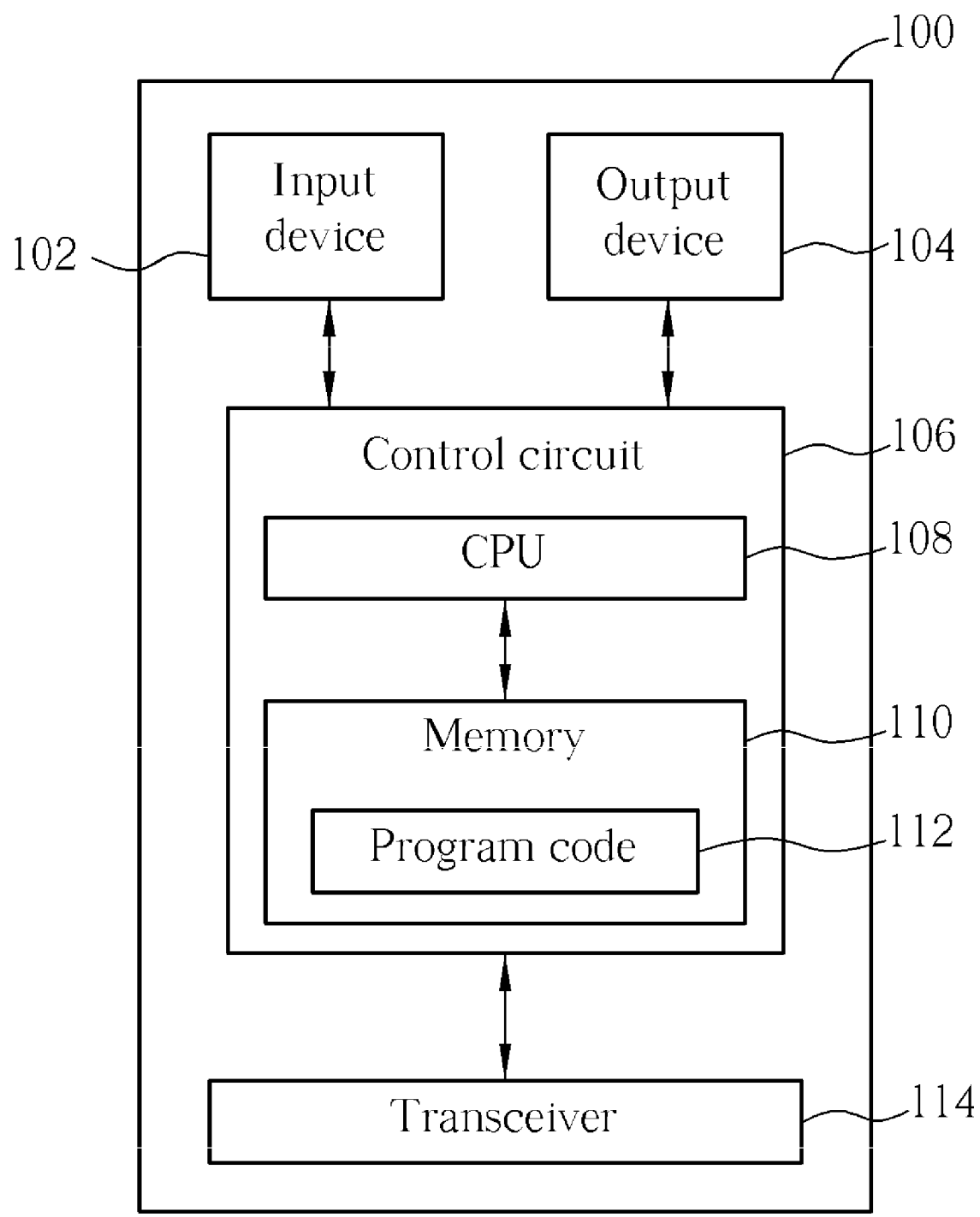
FIG. 2 is a function block diagram of a wireless communications device.

Please refer to FIG. 2, which is a functional block diagram of a communication device 100 in a wireless communication system. For the sake of brevity, FIG. 2 only shows an input device 102, an output device 104, a control circuit 106, a central processing unit (CPU) 108, a memory 110, a program code 112, and a transceiver 114 of the communication device 100. In the communication device 100, the control circuit 106 executes the program code 112 in the memory 110 through the CPU 108, thereby controlling an operation of the communication device 100. The communication device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communication protocol framework, the transceiver 114 can be seen as a portion of Layer 1, and the control circuit 106 can be utilized to realize functions of Layer 2 and Layer 3.

Figure 3:
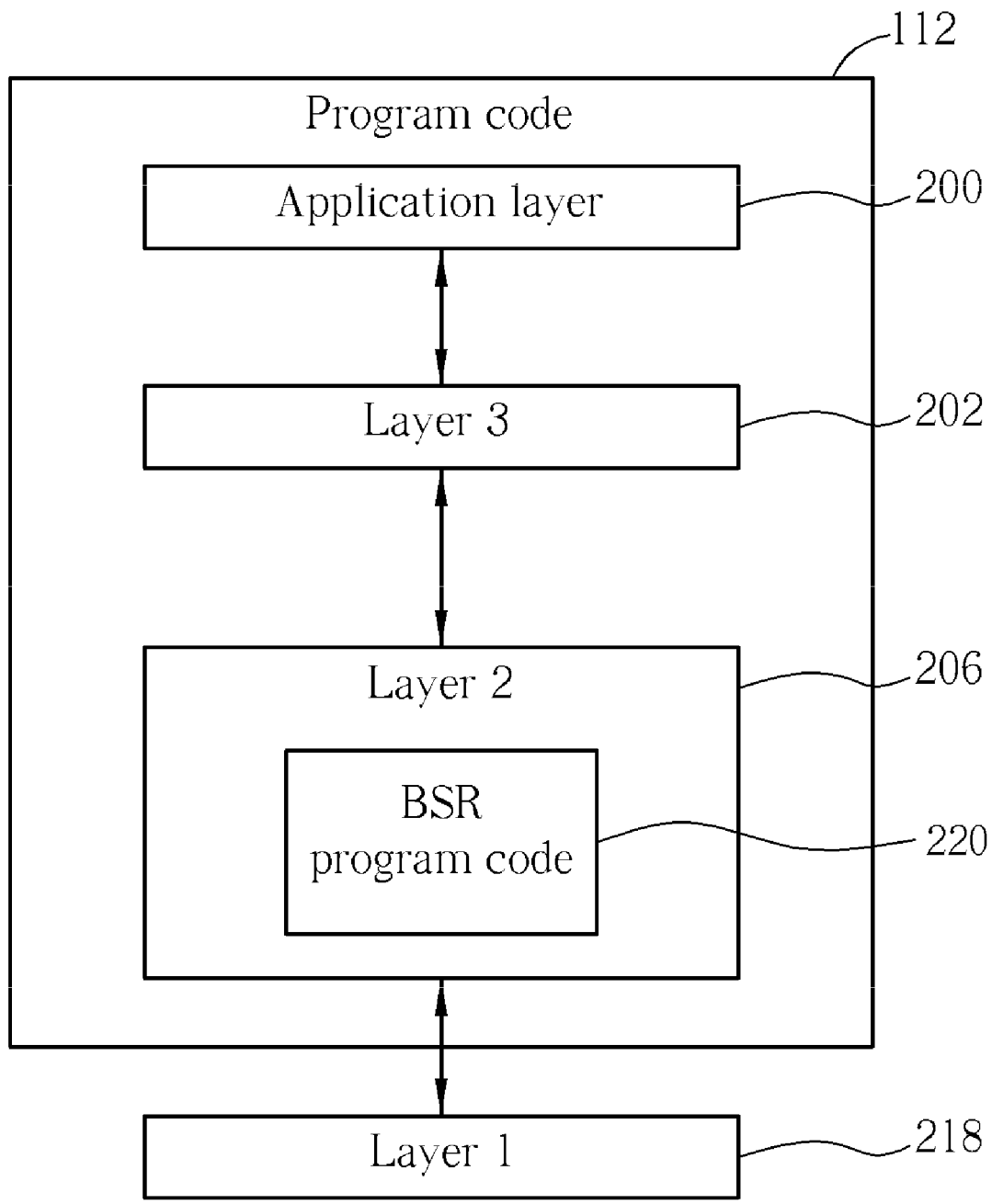
FIG. 3 is a diagram of program code of FIG. 2.
Figure 4:
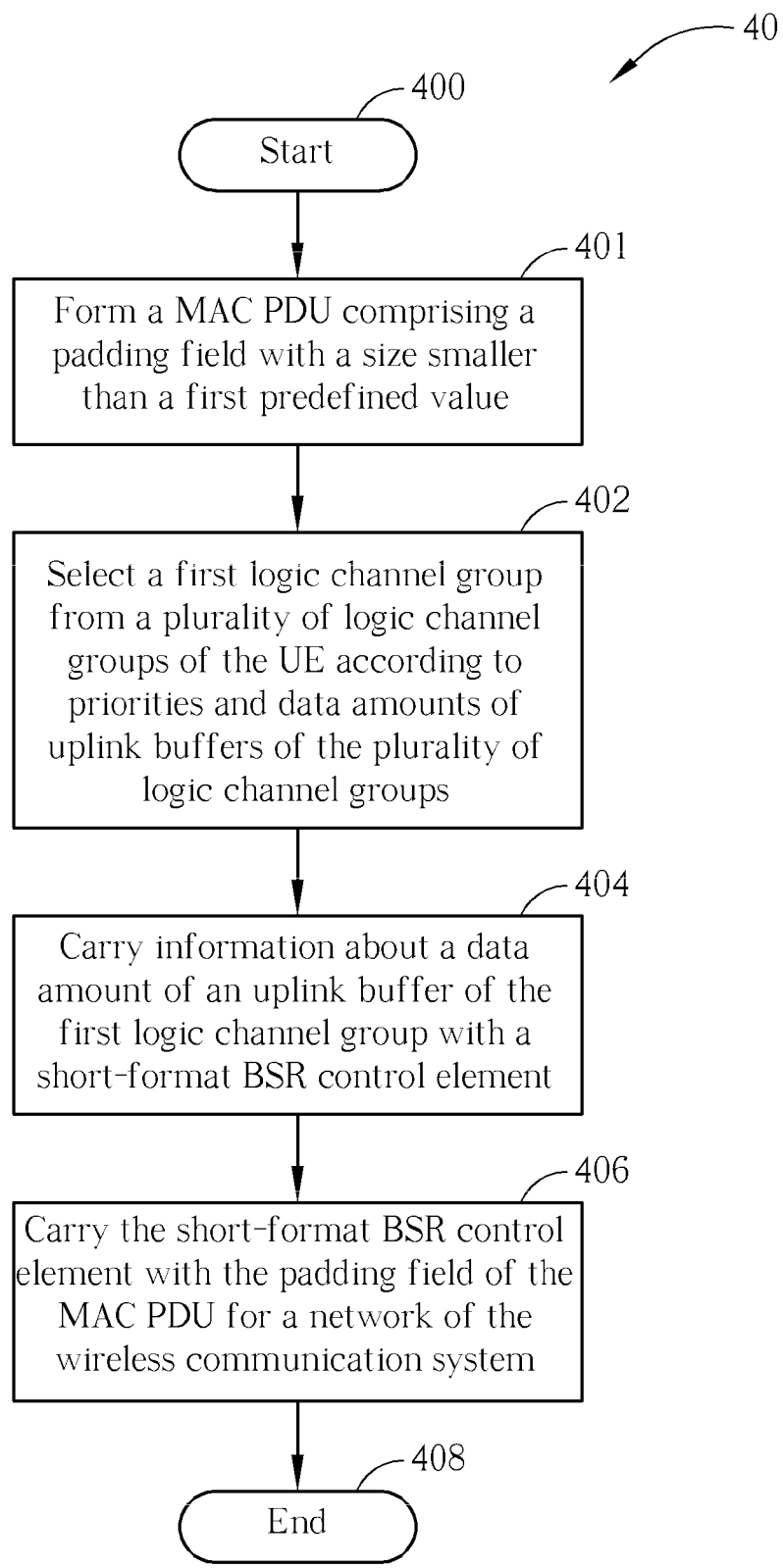
FIG. 4 is a flowchart of a process according to an embodiment of the present invention.

Please continue to refer to FIG. 4, which is a diagram of the program code 112 shown in FIG. 3. The program code 112 includes an application layer 200, a Layer 3 202, and a Layer 2 206, and is coupled to a Layer 1 218. The Layer 3 202 performs resource control. The Layer 2 206 comprises an RLC layer and a MAC layer, and performs link control. The Layer 1 218 performs physical connections.

In LTE, the MAC layer of the Layer 2 206 can perform a Buffer Status Reporting (BSR) procedure, to report status of one or all logic channel groups via long-format or short-format BSR control elements. In such a situation, the embodiment of the present invention provides a BSR program code 220, to decide a logic channel group corresponding to a short-format BSR control element. Please refer to FIG. 4, which illustrates a schematic diagram of a process 40. The process 40 is utilized for performing BSR in a UE of the wireless communication system 1000, to decide a logic channel group corresponding to a short-format BSR control element. The process 40 comprises the following steps:

Step 400: Start.

Step 401: Form a MAC PDU comprising a padding field with a size smaller than a first predefined value.

Step 402: Select a first logic channel group from a plurality of logic channel groups of the UE according to priorities and data amounts of uplink buffers of the plurality of logic channel groups.

Step 404: Carry information about a data amount of an uplink buffer of the first logic channel group with a short-format BSR control element.

Step 406: Carry the short-format BSR control element with the padding field of the MAC PDU for a network of the wireless communication system.

Step 408: End.

According to the process 40, when the UE performs BSR, if a corresponding MAC PDU comprises a padding field with a size smaller than a first predefined value, then the embodiment of the present invention selects a logic channel group according to priorities and data amounts of uplink buffers of all the logic channel groups, carries information about the data amount of the uplink buffer of the logic channel group with a short-format BSR control element, and returns the short-format BSR control element to the network via the MAC PDU.

Preferably, the embodiment of the present invention selects a logic channel group which has the highest priority and has an uplink buffer with data amount greater than 0 or a second predefined value, to be the target of information carried by the short-format BSR control element. Meanwhile, the first predefined value is preferably corresponding to a size for carrying a long-format BSR control element, namely 4 bytes (3 bytes for the length of the long-format BSR control element, plus one byte for corresponding header). In other words, when performing BSR, if a MAC PDU comprises remaining space (namely padding field) while the remaining space is merely enough for carry a short-format BSR control element rather than a long-format BSR control element, then the embodiment of the present invention selects the logic channel group which has the highest priority and has the uplink buffer with data amount greater than 0, to be the target of information carried by the short-format BSR control element, and carries the short-format BSR control element with the MAC PDU, so as to complete the BSR procedure.

Therefore, when the UE performs BSR, if the remaining space of the MAC PDU is only sufficient for carrying the short-format BSR control element, the embodiment of the present invention selects the logic channel group which has the highest priority and has the uplink buffer with data amount greater than 0 or a predefined value, to be the target of information carried by the short-format BSR control element. For example, if the UE uses a padding field of a MAC PDU to carry a BSR control element while the padding field is not long enough to carry a long-format BSR control element, then the MAC layer uses a short-format BSR control element to report status of a logic channel group, so as to fully utilize the remaining space (namely the padding field). In such a situation, the embodiment of the present invention selects a logic channel group which has the highest priority and has an uplink buffer with data amount greater than 0 or a predefined value, to be the target of information carried by the short-format BSR control element.

In summary, if the UE needs to perform BSR while the remaining space of the corresponding MAC PDU is only enough to carry a short-format BSR control element, then the embodiment of the present invention selects a logic channel group which has the highest priority and has an uplink buffer with data amount greater than 0 or a predefined value, to be the target of information carried by the short-format BSR control element.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing buffer status reporting in a user equipment of a wireless communication system comprising:
    forming a medium access control protocol data unit, abbreviated in MAC PDU hereinafter, comprising a padding field with a size smaller than a first predefined value;
    selecting a first logic channel group from a plurality of logic channel groups of the user equipment according to priorities and data amounts of uplink buffers of the plurality of logic channel groups;
    carrying information about a data amount of an uplink buffer of the first logic channel group with a short-format buffer status reporting, abbreviated in BSR hereinafter, control element; and
    carrying the short-format BSR control element with the padding field of the MAC PDU for a network of the wireless communication system;

wherein a priority of the first logic channel group is higher than priorities of other logic channel groups of the plurality of logic channel groups, and the data amount of the uplink buffer of the first logic channel group is greater than a second predefined value.

2. The method of claim 1, wherein a priority of the first logic channel group is higher than priorities of other logic channel groups of the plurality of logic channel groups, and the data amount of the uplink buffer of the first logic channel group is greater than 0.

3. The method of claim 1, wherein the first predefined value is corresponding to a size for carrying a long-format BSR control element.

4. The method of claim 1, wherein the short-format BSR control element comprises a single byte data composed of 8 bits, the former 2 bits indicate the first logic channel group, and the remaining 6 bits indicate the data amount of the uplink buffer of the first logic channel group.

5. The method of claim 1, wherein a plurality of logic channels is mapped to the first logic channel group and each logical channel is assigned a priority by a higher layer.

6. The method of claim 5, wherein a value of a priority is from 1 to 8 and the higher layer is a radio resource control layer.

7. A communication device utilized in a receiver of a wireless communication system for accurately performing buffer status reporting, the communication device comprising:
a processor for executing a program code; and
a memory coupled to the processor for storing the program code;
wherein the program code comprises: forming a medium access control protocol data unit, abbreviated in MAC PDU hereinafter, comprising a padding field with a size smaller than a first predefined value;
selecting a first logic channel group from a plurality of logic channel groups of the user equipment according to priorities and data amounts of uplink buffers of the plurality of logic channel groups;
carrying information about a data amount of an uplink buffer of the first logic channel group with a short-format buffer status reporting, abbreviated in BSR hereinafter, control element; and
carrying the short-format BSR control element with the padding field of the MAC PDU for a network of the wireless communication system;
wherein a priority of the first logic channel group is higher than priorities of other logic channel groups of the plurality of logic channel groups, and the data amount of the uplink buffer of the first logic channel group is greater than a second predefined value.

8. The communication device of claim 7, wherein a priority of the first logic channel group is higher than priorities of other logic channel groups of the plurality of logic channel groups, and the data amount of the uplink buffer of the first logic channel group is greater than 0.

9. The communication device of claim 7, wherein the first predefined value is corresponding to a size for carrying a long-format BSR control element.

10. The communication device of claim 7, wherein the short-format BSR control element comprises a single byte data composed of 8 bits, the former 2 bits indicate the first logic channel group, and the remaining 6 bits indicate the data amount of the uplink buffer of the first logic channel group.

11. The communication device of claim 7, wherein a plurality of logic channels is mapped to the first logic channel group and each logical channel is assigned a priority by a higher layer.

12. The communication device of claim 11, wherein a value of a priority is from 1 to 8 and the higher layer is a radio resource control layer.

* * * * *